Figure 1:
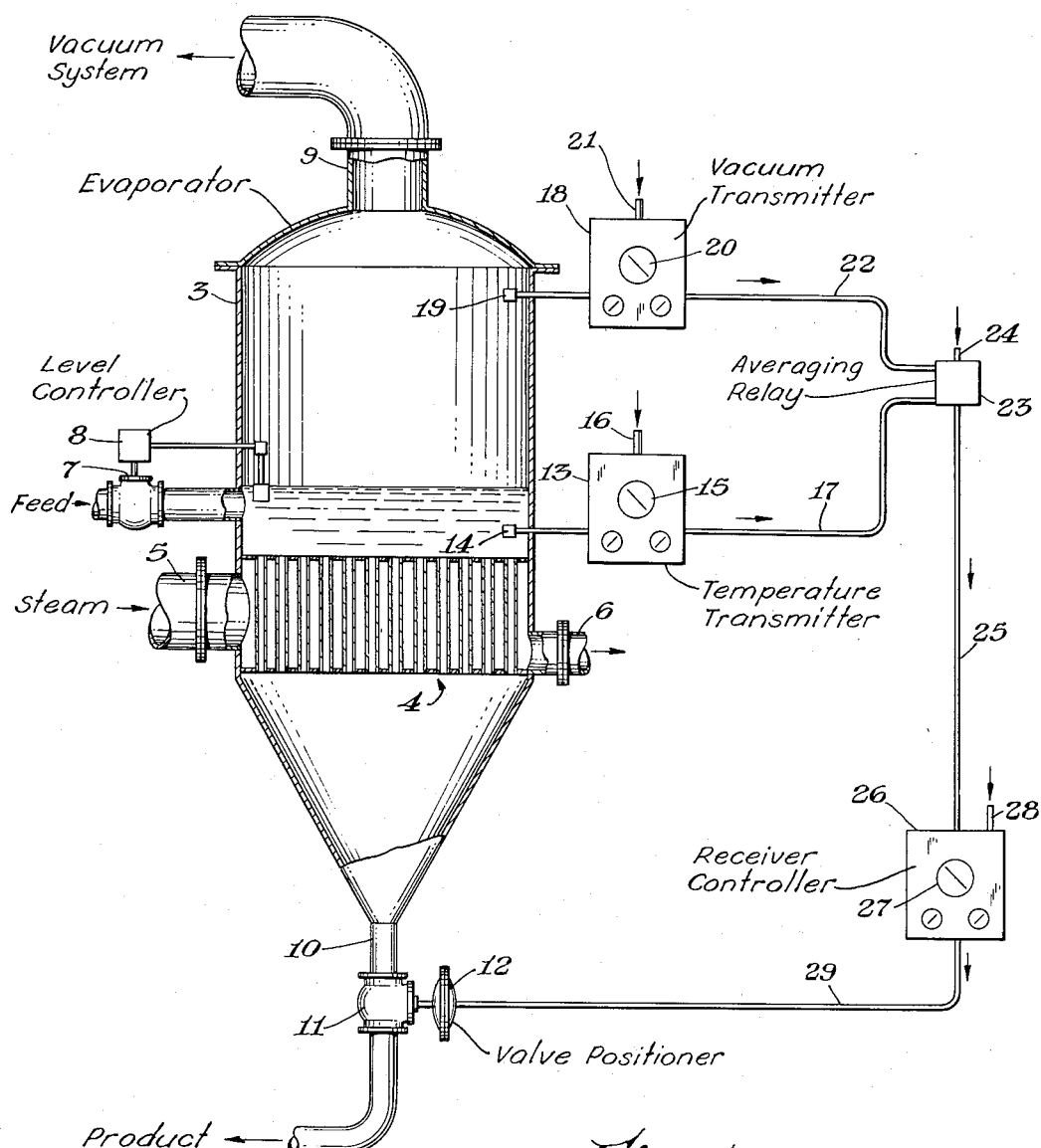

United States Patent Office 2,748,849
Patented June 5, 1956

2,748,849

AUTOMATIC CONTROL OF CONCENTRATING EVAPORATORS

Porter Hart, Lake Jackson, Tex., assignor to The Dow Chemical Company, Midland, Mich., a corporation of Delaware Application November 18, 1953, Serial No. 392,953

1 Claim. (Cl. 159—44)

This invention relates to an automatic system for controlling the operation of a concentrating evaporator.

In the chemical industry, it is commonplace to concentrate aqueous solutions of chemicals by boiling off part of the water, usually at reduced pressure. This process is conventionally carried out in a concentrating evaporator. Dilute solution to be concentrated is fed continuously into the evaporator inlet, entering the body maintained at a temperature and pressure such that the contents are actively boiling. Finished product is withdrawn continuously from the outlet, the rate of withdrawal being controlled so that the concentration of the product stays at a predetermined desired value.

One of the problems of evaporator control has been that the operator seldom is able to regulate all the variables affecting operation. For instance, in the case of very large steam-heated vacuum evaporators, such as are used in the salt and the caustic alkali industries, the rate of boiling, and sometimes even the temperature, are often limited by the amount of heating steam available. Likewise, the degree of vacuum (pressure reduction) in the boiling zone is commonly dictated by the capacity of the vacuum pump system. A further complication is the fact that, for any desired product concentration, there are quite a number of possible combinations of operating temperature and pressure which may be used, these combinations being defined by the vapor pressure characteristics of the solution being concentrated. Because of these many complexities, it has been customary, in even the most modern evaporator plants, to rely mainly upon manual control to maintain constant the concentration of the product. Such reliance, at its best, imposes high labor costs, and, at its worst, leads to erratic results.

It is therefore the principal object of the present invention to provide an automatic system capable of controlling adequately the operation of concentrating evaporators, despite the complexities mentioned. A further object is to provide such a system which will maintain the evaporator product at constant concentration while tolerating substantial variations in the operating temperature and pressure.

The system of the invention is used with concentrating evaporators having control means adjustable to regulate the concentration of evaporator product. In the most usual case of evaporators with continuous inflow and outflow of material, this control means is an outlet valve which may be varied in setting to regulate the rate of withdrawal of evaporator product. Thus, if the product tends to be too dilute, the valve is regulated to reduce the outflow. The liquid then remains in the evaporator longer, allowing further concentration. On the other hand, when the product tends to be too concentrated, the valve is opened further to allow more rapid outflow.

According to the invention, the control system comprises a temperature transmitter connected to produce an output which is a function of the temperature in the evaporator, and a pressure transmitter connected to produce an output which is a function of the pressure in the evaporator. There is also provided relay means which is responsive to both these transmitter outputs and is adapted to produce a relay output which is a function of the concentration of the evaporator contents. There is also a control mean, such as a valve positioner, which is actuated by the relay output and is connected to adjust the concentration control means, e. g. the evaporator outlet valve.

The invention may be explained in detail with reference to the accompanying drawings in which—

Figure 2:
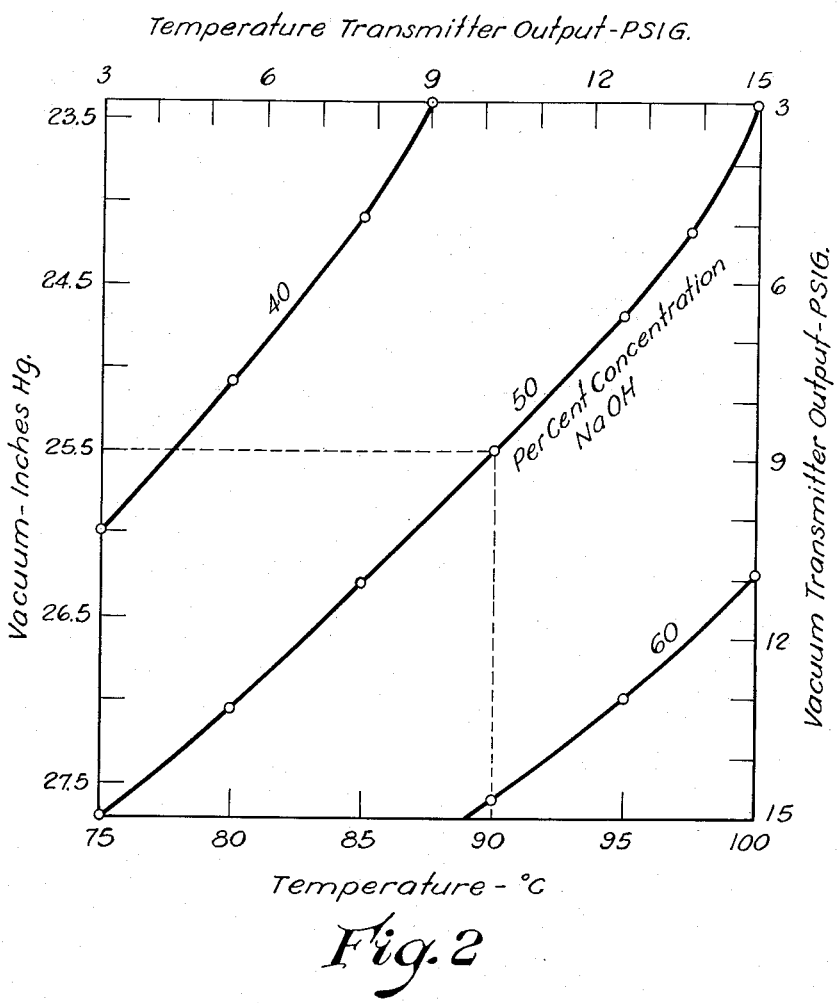

Fig. 1 is a schematic diagram showing a steam-heated vacuum concentrating evaporator equipped with the control system of the invention, and Fig. 2 is a chart showing the variation of evaporator vacuum with temperature for aqueous sodium hydroxide solutions of various concentrations, and the interrelation of these values to the output pressures of the vacuum transmitter and temperature transmitter in a control system according to the invention.

In the diagram of Fig. 1, an evaporator 3 of conventional design is shown arranged for concentrating dilute aqueous sodium hydroxide. Within the evaporator body near the bottom is a calandria 4 heated by steam entering through an inlet 5. Condensate leaves through a trapped outlet 6. Dilute sodium hydroxide to be concentrated is introduced through a feed inlet valve 7 regulated by a controller 8 to maintain constant the liquid level in the evaporator body. Water boiled out of the feed in the evaporator leaves as vapor through a top outlet 9 connected to a vacuum system, not shown, of capacity sufficient to maintain the evaporator at reduced pressure. Concentrated sodium hydroxide solution leaves as product through a bottom outlet 10 provided with a valve 11 adjustable in setting to control the rate of product outflow. The setting of the valve 11 is controlled by a spring-opposed pneumatic valve positioner 12 of conventional design which receives its operating pressure from the pneumatic control system of the invention.

As a part of the control system, a pneumatic temperature transmitter 13 of standard type has its temperature-sensitive element 14 immersed in the boiling sodium hydroxide solution in the evaporator 3. The indications of the temperature element are recorded on a clock chart 15. Compressed air is supplied to the transmitter from a source 16, conveniently at a pressure of 18 to 20 pounds per square inch gage. In conventional manner, the transmitter 13 modulates the air pressure to provide in the line 17 an output air pressure which is proportional to the temperature of the liquid in the evaporator. For instance, for boiling aqueous sodium hydroxide from a dilute feed to a product having a concentration of 40 to 60 per cent by weight, the transmitter 13 is set to produce an output air pressure varying linearly from 3 pounds gage at 75° C. to 15 pounds at 100° C. (see Fig. 2).

Also in the control system is a pneumatic vacuum transmitter 18 of standard design having its pressure-sensitive element 19 in the vapor space of the evaporator 3. The reduced pressure in the vapor space, expressed conveniently as vacuum in inches of mercury below atmospheric pressure, is recorded on a clock chart 20. In the conventional way, the transmitter 18 modulates compressed air from a source 21 and provides in the line 22 an output air pressure which is proportional to the degree of vacuum in the evaporator. The output pressure is thus inversely proportional to the absolute pressure in the evaporator. For example, in boiling the sodium hydroxide solutions already mentioned, the transmitter 18 is set to provide an output air pressure varying linearly from 3 pounds gauge at a vacuum of 23.4 inches of mercury (3.20 pounds per square inch absolute pressure) to 15 pounds at a vacuum of 27.7 inches of mercury (1.08 pounds per square inch absolute) (see Fig. 2).

A pneumatic averaging relay 23 of conventional design, actuated by compressed air from a source 24, receives as input the transmitter output pressures in the lines 17 and 22. This relay is adjusted to produce in the line 25 a relay output pressure which is the arithmetic average of the two transmitter pressures. For instance, if the pressure in the line 17 is 8 pounds gauge, and that in the line 22 is 10 pounds, the relay will provide a pressure of 9 pounds in the line 25.

The line 25 may, if desired, be connected directly to the valve positioner 12 on the evaporator product valve 11. In this case, the magnitude of the relay output pressure directly controls the setting of the valve 11. For greater convenience and flexibility, however, it is much preferred to apply the relay output pressure in the line 25 as the input to a pneumatic receiver-controller 26, as shown in Fig. 1. In this way, the relay pressure, which as will be shown, is a measure of the concentration of the evaporator contents, is recorded on a clock chart 27. In conventional manner, the receiver-controller 26 modulates compressed air from a source 28 and provides in the line 29 an output air pressure which is proportional to the relay output pressure in the line 25. This pressure is applied through a line 29 to the valve positioner 12. The receiver-controller 26 may incorporate standard proportioning controls, reset functions, and other refinements to allow more precise control of the valve 11.

The valve positioner 12 is adjusted to respond to the controller output pressure in the line 29, and to open or close somewhat the valve 11, in the proper direction and magnitude to tend to maintain constant the relay output pressure in the line 25, and correspondingly to maintain constant the concentration of the evaporator product. The product concentration may be held at any predetermined value within the range of the control system merely by adjusting the set-point of the receiver-controller 26.

The operation of the system of Fig. 1 may be explained with reference to the graph of Fig. 2. In this graph are plotted the vapor pressure-temperature-concentration data for a portion of the system sodium hydroxide-water. The bottom scale reads to temperature in degrees centigrade. The left-hand scale is for vapor pressure, plotted in terms of vacuum in inches of mercury (perfect vacuum, or zero absolute pressure, being 29.92 inches vacuum). Shown on the graph are solid lines corresponding to the boiling conditions of aqueous sodium hydroxide solutions of 40, 50, and 60 per cent by weight concentration. For instance, as shown by the dotted lines, at a vacuum of 25.5 inches of mercury (i. e. an absolute pressure of 4.42 inches of mercury or 2.17 pounds per square inch) aqueous sodium hydroxide of 50 per cent concentration boils at 90° C.

In Fig. 2, the top scale represents the output pressure of the temperature transmitter 13 at the temperatures shown along the bottom scale. Likewise, the right-hand scale represents the output pressures of the vacuum transmitter 18 at the degrees of vacuum shown along the left-hand scale. These two transmitter pressure scales are entirely arbitrary, the transmitters being adjusted at the time they are installed to correspond to the values in Fig. 2.

In operating the equipment shown in Fig. 1, the dilute sodium hydroxide solution to be concentrated is introduced continuously through the inlet 7. Steam is supplied to the calandria 4 to boil the liquid in the evaporator. The vacuum system is operated to withdraw the vaporizing water at a rate such as to maintain a good vacuum. In the particular system illustrated, the equipment is designed to run at temperatures of 75° to 100° C. and a vacuum of 23.5 to 27.5 inches of mercury. With the equipment running, the temperature transmitter 13 and vacuum transmitter 18 produce in the respective lines 17 and 22 output pressures corresponding to the temperature and vacuum in the evaporator. These two output pressures are averaged in the relay 23, which transmits the average value to the receiver-controller 26. The latter then opens or closes the valve 11 to maintain constant the relay output pressure, and correspondingly the concentration of the evaporator product.

Because of the averaging effect of the relay 23, the scale of the receiver-controller 26 may be calibrated to read directly the concentration of the boiling solution in the evaporator. This calibration is possible because of the fact that the vapor pressure-temperature lines for most aqueous solutions are practically linear over short ranges, as will be seen, for sodium hydroxide, from Fig. 2. For example, assume that the system is operating at 90° C. and 25.5 inches vacuum, producing 50 per cent aqueous caustic soda. The temperature transmitter is producing an output pressure of about 10.2 pounds while the vacuum transmitter is producing about 8.8 pounds. The output of the averaging relay is thus the average of these two values or 9.5 pounds. This value is indicated on the scale of the controller 26, which for this input is calibrated to read 50 per cent concentration. Suppose, however, that the vacuum drops to 24.7 inches and the temperature rises correspondingly to 95° C., values still falling on the 50-per cent line. At these conditions, the temperature transmitter output pressure is about 12.6 pounds and the vacuum transmitter output pressure is about 6.4 pounds. The output of the averaging relay under these conditions is still 9.5 pounds, so that the scale reading of the controller 26 remains unchanged. In other words, the output of the averaging relay, and hence the indication of the controller 26, are independent of both temperature and pressure, and are indicative of the concentration of the boiling solution. The system thus provides concentration control regardless of variations in temperature and pressure within the range for which the system is designed.

Suppose, for further purpose of illustration, that operation of the system of Fig. 1 has been steady at 25.5 inches vacuum and 90° C., making 50 per cent caustic soda. Then assume that the vacuum starts to fall toward 23 inches, but the temperature for the moment remains constant. If these conditions were to persist, the product would be of less than 50 per cent strength, as will be seen from Fig. 2. The output pressure of the vacuum transmitter then begins to fall, while that of the temperature transmitter is unchanged. Under this circumstance, the output of the averaging relay 23 begins to fall, causing the reading of the receiver-controller 26 to deviate from the set point corresponding to the desired 50 per cent strength. A corrective control impulse is at once applied to the valve positioner 12, closing the valve 11 slightly. The rate of product withdrawal then drops off somewhat, allowing the liquid to remain in the evaporator for a slightly longer time, and thus to be concentrated to the desired 50 per cent strength. (Stated another way, the reduction of throughput of the evaporator allows the temperature of the contents to rise to the boiling point corresponding to that of 50 per cent caustic soda at the new vacuum.)

It should be pointed out that, for any actual aqueous solution being concentrated in the evaporator, the scale reading of the receiver-controller 26 can be only a good approximation of the concentration of the evaporator contents. Perfect calibration is possible only when the vacuum-temperature lines are truly linear and are strictly parallel for different solution concentrations. However, for the comparatively narrow ranges of temperature and pressure in which most evaporators are designed to operate, the departure from linearity is not serious and the calibration can be made very close. Consequently, the system of the invention is capable of producing excellent concentration control, nearly independent of temperature and pressure, within the range of the evaporator.

It will, of course, be appreciated that, for solutions other than sodium hydroxide, the operating ranges for the temperature and vacuum transmitters will have to be changed from those shown in Fig. 2. However, it is necessary only that these ranges be adjusted so that the output of the averaging relay falls on the temperature-vacuum-concentration curve for the particular solution being evaporated. These and other minor adjustments within the principle of the invention will be readily apparent to instrument engineers.

What is claimed is:

In combination with a continuous-flow vacuum concentrating evaporator having an outlet valve adjustable to control the rate of withdrawal of evaporator product, a product concentration control system comprising a pneumatic temperature transmitter connected to produce an output air pressure proportional to the temperature of the boiling liquid in the evaporator, a pneumatic vacuum transmitter connected to produce an output air pressure proportional to the degree of vacuum in the vapor space of the evaporator, an averaging relay responsive to the two transmitter output pressures and producing a relay output pressure proportional to the average of the two transmitter output pressure, a pneumatic receiver controller for indicating the value of the relay output pressure and providing a controller output varying with changes in the relay output pressure, and a valve positioner operated by the controller output pressure connected to adjust the evaporator outlet valve in the direction to maintain the averaging relay output pressure at a predetermined value.

References Cited in the file of this patent
UNITED STATES PATENTS

| | | |
|---|---|---|
| 559,857 | Lillie | May 12, 1896 |
| 2,073,825 | Beck et al. | Mar. 16, 1937 |
| 2,519,608 | Stilson | Aug. 22, 1950 |
| 2,526,843 | Birchler et al. | Oct. 24, 1950 |